US009592466B2

(12) United States Patent
Sullivan

(10) Patent No.: US 9,592,466 B2
(45) Date of Patent: *Mar. 14, 2017

(54) DIRECT REPLACEMENT AIR FILTER WITH AUTOMATIC PLEATED FILTER MEDIA ADVANCE

(71) Applicant: Challen Sullivan, Delray Beach, FL (US)

(72) Inventor: Challen Sullivan, Delray Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/188,668

(22) Filed: Feb. 24, 2014

(65) Prior Publication Data
US 2015/0053081 A1 Feb. 26, 2015

Related U.S. Application Data

(63) Continuation of application No. 13/677,285, filed on Nov. 14, 2012, now Pat. No. 8,657,906, which is a continuation of application No. 12/585,514, filed on Sep. 16, 2009, now Pat. No. 8,313,567.

(51) Int. Cl.
*B01D 46/52* (2006.01)
*B01D 46/16* (2006.01)
*B01D 46/22* (2006.01)
*B01D 46/18* (2006.01)
*B01D 46/00* (2006.01)

(52) U.S. Cl.
CPC ........... *B01D 46/16* (2013.01); *B01D 46/008* (2013.01); *B01D 46/0058* (2013.01); *B01D 46/18* (2013.01); *B01D 46/185* (2013.01); *B01D 46/22* (2013.01); *B01D 46/521* (2013.01); *B01D 2273/14* (2013.01)

(58) Field of Classification Search
CPC ............ B01D 46/0052; B01D 46/0054; B01D 46/0058; B01D 46/008; B01D 46/18; B01D 46/185; B01D 46/22; B01D 46/521; B01D 2273/14
USPC ........ 55/351, 352, 354; 95/273, 277; 96/429
See application file for complete search history.

(56) References Cited

U.S. PATENT DOCUMENTS

| 1,982,639 | A | * | 12/1934 | Christofferson | ................ 55/352 |
| 2,016,991 | A | * | 10/1935 | Dollinger | ........................ 55/354 |
| 2,500,123 | A | * | 3/1950 | Gwaltney et al. | .............. 55/290 |
| 2,808,899 | A | * | 10/1957 | Hofstetter | ....................... 55/354 |
| 3,276,191 | A | * | 10/1966 | Revell | ............................ 55/354 |

(Continued)

*Primary Examiner* — Robert Clemente
(74) *Attorney, Agent, or Firm* — Tangent Law Group, PLLC; Eric J. Weierstall, esq.

(57) ABSTRACT

The invention is directed to replacement media advancing air filter in air handling units with a flow channel. The filter having a housing and an exposure slot with filter media storage area that has an unexposed pleated, folded filter media portion stored therein. The filter media portion being folded and stacked in and compactly held at least in part within the storage area. A motor is coupled to a power supply and in communication with a controller. The motor moves a movement member that moves a portion of the filter media from a stored state in the storage area into the exposure slot and is exposed to the air in the air flow channel creating an exposed portion of the filter media. The exposed portion is collected within a containment area as a further portion of media is moved into the exposure slot to replace the exposed portion therein.

16 Claims, 7 Drawing Sheets

(56) References Cited

U.S. PATENT DOCUMENTS

| | | | | |
|---|---|---|---|---|
| 3,337,898 A * | 8/1967 | Zador et al. | 15/404 |
| 3,408,795 A * | 11/1968 | Revell et al. | 55/354 |
| 3,596,442 A * | 8/1971 | Neumann | 55/354 |
| 3,695,008 A * | 10/1972 | Neumann | 55/354 |
| 3,774,373 A * | 11/1973 | Welch et al. | 55/354 |
| 3,985,528 A * | 10/1976 | Revell | 55/352 |
| 4,054,521 A * | 10/1977 | Winzen | 210/137 |
| 4,221,576 A * | 9/1980 | Phillips, Jr. | 55/352 |
| 4,394,146 A * | 7/1983 | Klein | 55/354 |
| 4,405,342 A * | 9/1983 | Bergman | 95/69 |
| 4,470,833 A * | 9/1984 | Wolfe | 96/429 |
| 5,217,513 A * | 6/1993 | Armbruster | 96/414 |
| 5,405,434 A * | 4/1995 | Inculet | 96/54 |
| 5,560,835 A * | 10/1996 | Williams | 210/783 |
| 5,906,752 A * | 5/1999 | Williams | 210/783 |
| 5,912,423 A * | 6/1999 | Doughty et al. | 95/107 |
| 6,152,998 A * | 11/2000 | Taylor | 96/429 |
| 6,168,646 B1 * | 1/2001 | Craig et al. | 95/14 |
| 6,402,822 B1 * | 6/2002 | Najm | 96/429 |
| 6,454,834 B1 * | 9/2002 | Livingstone et al. | 95/11 |
| 6,632,269 B1 * | 10/2003 | Najm | 95/273 |
| 7,151,264 B2 * | 12/2006 | Ehlers, Sr. | 250/373 |
| 7,186,290 B2 * | 3/2007 | Sheehan et al. | 95/277 |
| 8,313,567 B2 * | 11/2012 | Sullivan | 95/277 |
| 8,657,906 B2 * | 2/2014 | Sullivan | 55/354 |
| 2006/0070527 A1 * | 4/2006 | Chapman et al. | 96/417 |
| 2006/0102006 A1 * | 5/2006 | Powell | 96/429 |

* cited by examiner

DIRECT REPLACEMENT AIR FILTER WITH AUTOMATIC PLEATED FILTER MEDIA ADVANCE

CROSS-REFERENCE TO RELATED APPLICATIONS

This application is a continuation-in-part of and claims priority to U.S. patent application Ser. No. 12/585,514, filed Sep. 16, 2009, which is incorporated herein by reference. This application is a further continuation of and claims priority to U.S. patent application Ser. No. 13/677,285 filed Nov. 14, 2012.

BACKGROUND OF THE INVENTION

Field of the Invention

The invention is directed to a direct replacement air handler filter having a unitary housing. The unitary housing having a standard width for air handler filters so as to be a direct replacement for existing standard filters and future air filters. The unitary housing contains a movement member, a motor, a power source, a controller and a filter media. The product strives to be both directly replaceable with a filter and disposable with minimum environmental impact. The replacement air handler filter being further located within a channel in the air handler unit wherein the air is passed within the channel and passed through the filter media. The replacement air filter having a compacted or stored portion of the filter media that is moved out to replace the initial and subsequent sections of filter media exposed by the invention to air within the air handler unit.

Background of the Invention

An important component in almost all Heating, Ventilation and Air Conditioning (HVAC) units is a filtration mechanism for removal of particulates and contaminants from the air flow before or after coming into contact with heat exchanging elements. The removal of the contaminants helps prevent reduction in heat transfer associated with accumulation of the contaminants on the heat exchanger elements. Additionally, the removal of these contaminants also improves the quality of the air circulated by the HVAC system. The timing for replacing or renewing these filtration mechanisms is important.

In most systems a filter is used through which the air is passed. Dirty filters result in less flow rate of air which translates to less heat exchange in the HVAC equipment. The equipment must run longer to accomplish the intended goal, and air conditioning equipment may freeze up due to inadequate heat exchange. Additionally, the motors and other components must run longer and harder resulting in increased wear on the entire HVAC system, reducing its useful life. Thus, the filtration systems of conventional HVAC units require constant attention and maintenance. Many companies sell maintenance contracts to residential clients, typically annual or bi-annual in nature, to address routine maintenance. However the removable, replaceable filters that are typically in these units require more frequent replacement by these clients.

Filters for most residential and some commercial furnaces and air conditioning equipment are typically removable, replaceable, rigid, framed units. Rigid framed filters can be time consuming to replace or clean and often require frequent replacement, typically monthly. This also requires an added amount of attention by a residential unit owner. In a commercial setting the restaurant owner or similar commercial customer must provide an even greater amount of attention to cleaning and/or replacing these types of filters. The filters often go unchanged as users forget to change the filter regularly. This shortfall has been well known and several attempts have been made in the past to provide long lasting filters. Several attempts have been made to provide a reel system, see for example US Patent Application No. 2006/0102006, Japanese Patent No. JP06233945, German Patent No. DE19654844 A1, U.S. Pat. Nos. 6,168,646, 4,470,833,6152998, 4221576.

Though these have extended lengths of service, in each instance, the resulting device requires either modification of the HVAC unit or extension of the device from the standard width and location of the filter. Additionally, these devices are often hardwired into the electrical system of the existing unit, requiring modification of the electrical connections within the existing HVAC unit. This makes these existing devices impractical for easy use by a typical end user. For example, as seen in U.S. Pat. Nos. 6,152,998, 6,632,269, 6,491,735, 6,402,822, and 6,743,282 and the commercially available OPTIMAIR system, often the reels are located outside the unit and are located in a reel storage area that is non-uniform in width. This also prevents direct replacement of the existing filter with these types of units as the footprints are completely different and these systems are not direct replacement for the existing filter.

Other commercial applications use sheets that are stretched between rolls on either side of an air duct, see for example U.S. Pat. No. 6,632,269 to Najm, U.S. Pat. No. 4,221,576, 4,331,576 to Phillips Jr., or U.S. Pat. No. 6,152, 998 to Taylor. In each embodiment, significant modifications to the HVAC or cooling system would need to be made to install the devices or they use a non-standard footprint. The systems do not provide retrofitting the filter structure to existing HVAC equipment and moreover, they require significant installation steps as outlined above with respect to residential units that operate in a similar manner.

Additional attempts have been made to address the issue in a commercial HVAC application, for instance U.S. Pat. No. 7,186,290 to Sheehan. In U.S. Pat. No. 7,186,290, a stack of filters is cycled through the device. This system requires a large amount of modification to incorporate into existing devices, as with other existing designs. Additionally, the stacks of stored filters require a significant amount of space in or around the HVAC unit. Thus, existing systems require either significant additional modifications or additional space to operate and provide extended use filter systems. Moreover, no economical method of providing a self-renewing or extended use air filter within the standard footprint of the existing filter housings has been provided.

A direct replacement filter would be one that fits into existing filter footprints as defined by the OEM. A uniform and industry standard width is provided in almost all residential and most commercial filters. The filters shown in all of these patents and publications are not direct replacement filters as they would require extensive modifications to fit in the place of the existing filters in these HVAC systems. In addition to not fitting a standard footprint, filter units like those shown would require opening and disposal of the spent filter media, exposing the user and the device to the contaminants that were already collected. Further the installation of the systems would require additional wiring and would likely require professional installation.

To date, no commercially successful system has been produced for use in conventional HVAC systems without modification or extending beyond the footprint provided for the replaceable filter, in other words a direct replacement for the filter. A direct replacement filter having a footprint that fits in the standard width provided in today's HVAC systems that has an extended use, while being more environmentally friendly and remaining sealed preventing re-exposure or re-admission of contaminants to the air and the system is needed. Moreover, no economical method of providing a self-renewing or extended use air filter within the standard footprint of the existing filter housings has been provided.

There is, therefore, a need for a method and apparatus for providing for a self-renewing air filter for HVAC applications that has a standard footprint that fits within existing commercial and residential apparatus, provides extended useful life to the filter, requires little or no modification to install in existing equipment, and has a minimal impact on the environment when discarded.

SUMMARY OF THE INVENTION

An object of the invention is to provide an extended life direct replacement air handler filter that is fully disposable and is constructed with "green" materials so as to have a minimum impact on the environment when it is discarded.

Yet another object of the invention is to provide a sealed direct replacement air handler filter to minimize re-admission and exposure to the collected contaminants during operation and replacement, the spent filter being contained within the sealed housing. Unlike many roller systems which require removal or handling of the spent filter material, the instant invention minimizes this contact and the potential for readmission to the air handler.

A still further object of the instant invention is to provide a direct replacement air filter having a pleated, folded filter media with a controller, the pleated filter media and the controller being in a sealed housing and the pleated media filter being distributed across a grid and folding at its pleats in the presence of air within an airflow channel. The controller moves the media within the sealed housing over an extended period of time, while the housing fits a standard width or footprint for an existing air filter.

The invention includes an apparatus and a method for moving air filter media within the apparatus. The apparatus of the invention includes a direct replacement automatic media advancing air handler filter within an air flow channel having a unitary housing with a uniform thickness throughout the length and width of the unitary housing and an at least one exposure slot. An at least one filter media storage area is provided having unexposed filter media stored therein, the unexposed filter media being pleated, folded, and stacked to be compactly held within the at least one filter media storage area and an at least one motor coupled to an independent power supply and in communication with a controller, the at least one motor moving an at least one movement member that pays out an unexposed portion of the at least one filter media into the at least one exposure slot and exposes the unexposed portion of the at least one filter media to the air flow channel creating an exposed portion of the at least one filter media. The exposed portion is being paid out across an at least one supporting member with the at least one supporting member forcing the at least one filter media to fold at its pleats into a zig-zag pattern when placed into an air flow in the air flow channel and the paying out the at least one filter media being based on output from the controller. A containment area is also provided, wherein the exposed portion of the at least one filter media is collected and retained within the containment area.

The at least one movement member can be an at least one cord, wire, or string, and the at least one cord, wire, or string is further attached to the pleated filter media via reinforcement tabs, wherein the at least one cord, wire, or string is rolled up on a take-up roller for a pre-determined time or length and the exposed filter media is moved to the collection area and the exposed media is folded at its pleats and stored in a compacted state.

The at least one movement member can also be an at least track with an at least one supporting spanning member, the at least one track member being moved by the motor and in turn moving the at least one spanning supporting member which engages the unexposed filter media at a pleat and carries the unexposed filter media from the at least one filter media storage area to the slot and then, upon a signal from the controller the motor further moves the track member and the at least one supporting and spanning member to move the now exposed filter media to the containment area.

The containment area can be sealed within the housing by a separate sealing element. The movement member can re-fold the at least one pleated filter media after its exposure and store it compactly in the containment area. When the at least one filter media is moved to the collection area and the exposed media can be folded at its pleats and stored in a compacted state, such that readmission of the filtered contaminants is minimized.

The unitary housing can be comprised of at least one of an environmentally friendly cellulose, an environmentally friendly cardboard, an environmentally friendly paper, and an environmentally friendly organic plastic like compound or plastic and the power source further comprises a lithium ion battery.

The controller can further include a clock or a programmed advancement profile, wherein the at least one movement member is engaged based on the clock or the programmed advancement profile.

The at least one movement member can be an at least one roller, the roller paying out the filter media from the pleated, folded storage area and taking up the exposed filter material and rolling it about the roller in a containment area. The at least one movement member can also be an at least one set of pinch rollers, the pinch rollers pulling the filter to pay out the filter media from the pleated, folded storage area and feeding the exposed filter media into a containment area. The at least one independent power supply can be a battery or battery pack. The unitary housing can be sealed throughout to prevent opening of the unitary housing.

The apparatus of the invention also includes a direct replacement air handler filter system within an air flow channel within an air handler unit having a unitary housing comprised of at least one of at least one of an environmentally friendly cellulose, an environmentally friendly cardboard, an environmentally friendly paper, and an environmentally friendly organic plastic like compound or plastic having a uniform thickness of between about one inch and three inches throughout its length and width and having an exposure slot there through and the unitary housing being sealed throughout to prevent opening of the unitary housing; a motor coupled to a lithium ion battery power source and in communication with a controller having an at least one sensor input or a timer; and a filter media storage area located on one end of the unitary housing, with a pleated, folded filter media folded and compactly stored inside the filter media storage area, and an exposed filter media containment area located on an opposed end within the unitary housing with the filter media extending therebetween, the filter media being paid out from said filter media storage area across the housing and the exposure slot while being supported by an at least one support member where it is exposed to air within the air flow channel and folds along its pleats into a zig-zag pattern and removes contaminants from the air and is further passed through to a containment area where the filter media is re-folded, collected, and compactly stored with the filtered contaminants, the motor being activated by said controller in response to input from the at least one sensor or based on a timed input from said timer and moving an at least one movement member to move the filter media across the exposure area.

The method of the invention includes a method of moving a pleated filter media within a uniform length and width, direct replacement air handler filter frame comprising the method steps of: storing an unexposed folded, pleated filter media compactly within an at least one filter media storage area storage; engaging an at least one motor coupled to an independent power supply in communication with a controller and the at least one motor moving an at least one movement member; paying out through the movement of the at least one movement member by the at least one motor an unexposed portion of the at least one filter media into an at least one exposure slot and exposing the unexposed portion of the at least one filter media to the air flow channel creating an exposed portion of the at least one filter media, the exposed portion being paid out across an at least one supporting member with the at least one supporting member forcing the at least one filter media to fold at its pleats into a zig-zag pattern when placed into an air flow in the air flow channel and the paying out of the at least one filter media being based on output from the controller; and collecting in a containment area the exposed portion of the at least one filter media and retaining it within the containment area.

Moreover, the above objects and advantages of the invention are illustrative, and not exhaustive, of those which can be achieved by the invention. Thus, these and other objects and advantages of the invention will be apparent from the description herein, both as embodied herein and as modified in view of any variations which will be apparent to those skilled in the art.

BRIEF DESCRIPTION OF THE DRAWINGS

Embodiments of the invention are explained in greater detail by way of the drawings, where the same reference numerals refer to the same features.

DETAILED DESCRIPTION OF THE INVENTION

The instant invention is directed to a direct replacement air handler filter having a sealed housing. In the exemplary embodiments, the sealed housing is a unitary sealed housing having a uniform thickness throughout and being of a standard width for air handler filters so as to be a direct replacement filter for existing HVAC systems. The unitary housing contains, at least in part, an at least one motivator or movement element, a motor, and a power source, all of these elements being green friendly, a controller and a filter media. The product is therefore both replaceable and disposable with minimum environmental impact. The replacement air handler filter being further located within a channel in the air handler unit wherein the air is passed within the channel and passed through the filter media.

The exemplary embodiments of the invention shown utilize a compacted "clean" portion of the filter media that is deployed, exposed, and collected within the housing. In the exemplary embodiments shown, the filter media is folded or pleated and stored in a storage section. A movement element in the embodiments is attached to the media. In response to the controller the motor moves the movement element, the movement element in turn moves the existing exposed media into a collection section where it folds and is stored and draws an unexposed portion into the exposure area. The movement of the filter media is provided by the movement element. This results in an extended length direct replacement air handler filter that does not require special installation, minimizes environmental impact after disposal, and is self-contained thus minimizing re-exposure. The movement element or member also draws or moves unexposed filter into the air channel. This can, in an exemplary embodiment, be a pleated, folded filter media, the pleats providing added surface area in the exposure area. The filter media is collected and stored in a containment area preventing admission and re-exposure of the collected contaminants to the air or the HVAC system.

Figure 1:
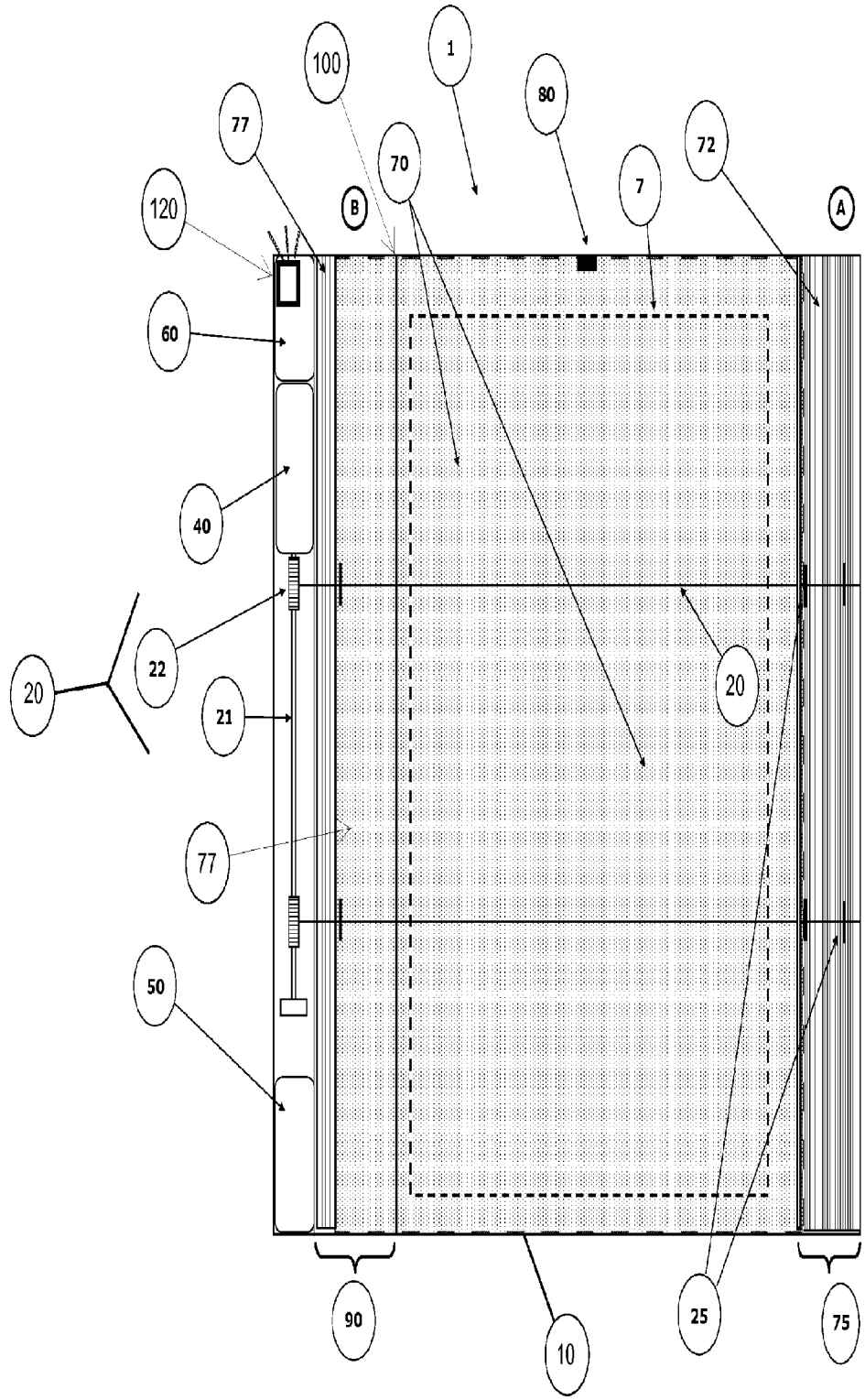
FIG. 1 illustrates a top view of an embodiment of the instant invention.

FIG. 1 illustrates a top view of an embodiment of the instant invention. An air handler unit direct replacement air filter 1 is shown. The direct replacement air filter is located such that it is in a path or channel of the air being handled by an air handler (not shown). The direct replacement air filter 1 has a unitary housing 10. The unitary housing 10 has a uniform thickness throughout its length and width and is sealed and self-contained so as not to be opened by an operator or end user. The thickness typically being of a standard width for air handler filters so as to be a direct replacement in existing air handlers, for example but certainly not limited too 1" in thickness for residential HVAC systems. In similar commercial applications these thicknesses can be for instance, but certainly not limited to, between one and three inches. An exposure area, vent, opening, or slot 7 is provided within the housing, the exposure area 7 being of sufficient size to permit air from the air channel to be flowed there through. The unitary, sealed housing 10 contains an at least one motivator or movement device 20, in this instance a roller or shaft, the movement device 20 being driven by a motor 40 with a power source 50, a controller 60 and a filter media 70.

The unitary, sealed housing 10 can be in an exemplary embodiment comprised of, for example but certainly not limited to, environmentally friendly stiffened plastics, paper or cellulose product, organic plastic like compounds, or similarly green materials. The housing contains an at least one motivator or movement device 20, in this instance a take up shaft 21, having the filter media 70 attached thereto. In the embodiment shown, the take up shaft 21 is coupled to the motor 40 which is in turn coupled to the power source 50 and to the controller 60. The power source 50 is in this case being an environmentally friendly disposable battery, such as but certainly not limited to a lithium ion battery.

The controller 60 selectively powers the motor 40 based on inputs from an at least one sensor 80 in the exemplary embodiment. The controller 60 can, for example, comprise a printed circuit board having a microprocessor in communication with the at least one sensor 80. The at least one sensor 80 can for instance be a magnetic sensor that determines the position of the filter media 70 based on embedded magnetic tags in the filter media 70. In the exemplary embodiment, the controller 60 is activated at installation and tracks days or hours in operation. In the exemplary embodiment the controller 60 can count, for example but certainly not limited to, three months and activate the motivator or movement device 20, in this case the take up shaft 21 with motor 50. Based on the sensor input the controller 60 can determine the position of the media filter 70 and stop when a "clean" element or measured portion of filter media 70 is in position. The controller 60 can also be used to sense a condition of the air, the filter media 70, or a combination of both through communication with the at least one sensor 80. The controller 60 can also be used to advance the take up shaft 21 based on the sensed conditions or as a timed or pre-programmed operating profile in further embodiments.

The advance of the shaft pays out or unfolds the uncontaminated filter media 72 on a first or feed side, designated by "A" in FIG. 1, of the housing 10. While simultaneously on the opposite side, a filter media take-up compartment 90 is located on a second or take up side, designated by "B" in FIG. 1 collecting the spent or contaminated filter media 77 in the designated containment area 90. In the embodiment of FIG. 1, spanning or support members 105 are laid in a grid and the unexposed filter media is drawn along it, as best see in FIG. 2. The filter media 70 has pleats already placed in it. The filter media 70 has an unexposed portion 72 that is folded and compactly stored in the media storage area 75 of the housing, the unexposed, folded portion of the filter media 72 when exposed to the airflow is oriented such that the pleats are matched against and pushed onto spanning or support members 105 through the pressure exerted by the passing air. This allows for a zig-zag pattern to form and increases the overall surface area of the filter media presented to the airflow in the channel In the instant embodiment the contaminated filter media 77 is folded on itself and thereby stores and captures the collected particulate matter. In additional embodiments, the contaminated filter media 77 is contained in a containment area 90 having a seal 100 to retain the contaminated filter media and any captured contaminants. In both cases, the contaminated filter media 77 is being collected within the containment area 90 and further within the unitary housing 10 so as to minimize exposure for reintroduction of the contaminants from the exposed filter media 77 and, simultaneously, preventing contact of the containments with the operator or the environment during replacement. The HVAC filter media 70 is provided with a greater amount of filter material 70 stored in the filter media storage area 75 than existing rigid frame, stationary filters, allowing for extended life. For example, sufficient uncontaminated filter 72 media can be provided to make a six or twelve month filter.

Once the uncontaminated filter 72 media is emptied, the controller can activate an indicator element 120. The indicator element can be, but is not limited to an audible alarm or visual indicator element or LED. Similarly, a scent material may be utilized on all but the last piece of the uncontaminated filter 72 media such that the absence or presence of the scent is an indicator that the filter needs to be replaced. Either after a specified time period or once the indicator element 120 is activated, the user simply removes and replaces the existing device in its entirety. The spent filter media 77 is contained and the re-admission of the filtered contaminants is minimized. The expired HVAC filter 1 can then be safely disposed of with minimal environmental impact.

Figure 2:
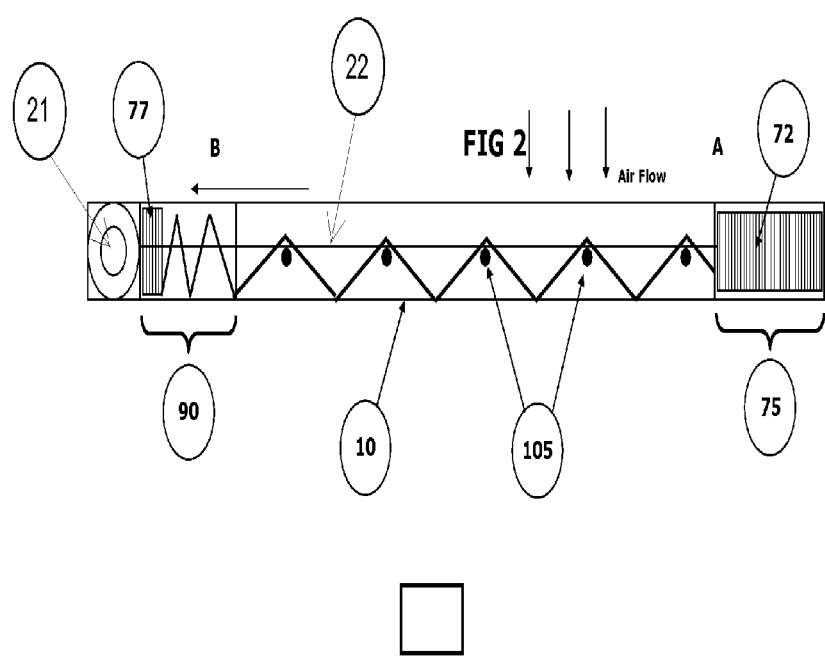
FIG. 2 shows a side view of the embodiment of FIG. 1.

FIG. 2 shows a side view of the embodiment of FIG. 1. As can be seen in the side view, the filter media 70 is pleated and compacted in a storage area 75. The movement member 20 is provided here via a cord, wire, or string 22 and take up shaft 21. The string 22 is attached to the pleated filter media 70 via reinforcement tabs 25. As noted above, as determined by the controller 60, the motor 40 and take up shaft or roller 21 are activated and roll the string 22. The string 22 is drawn for a predetermined time or length and accumulated on the roller 21. The expended filter media 77 is then accumulated in a containment or storage area 90 as described above. The reinforcement tabs 25 can be made so that they release from the string 22 when it reaches the collection area 90.

Figure 3:
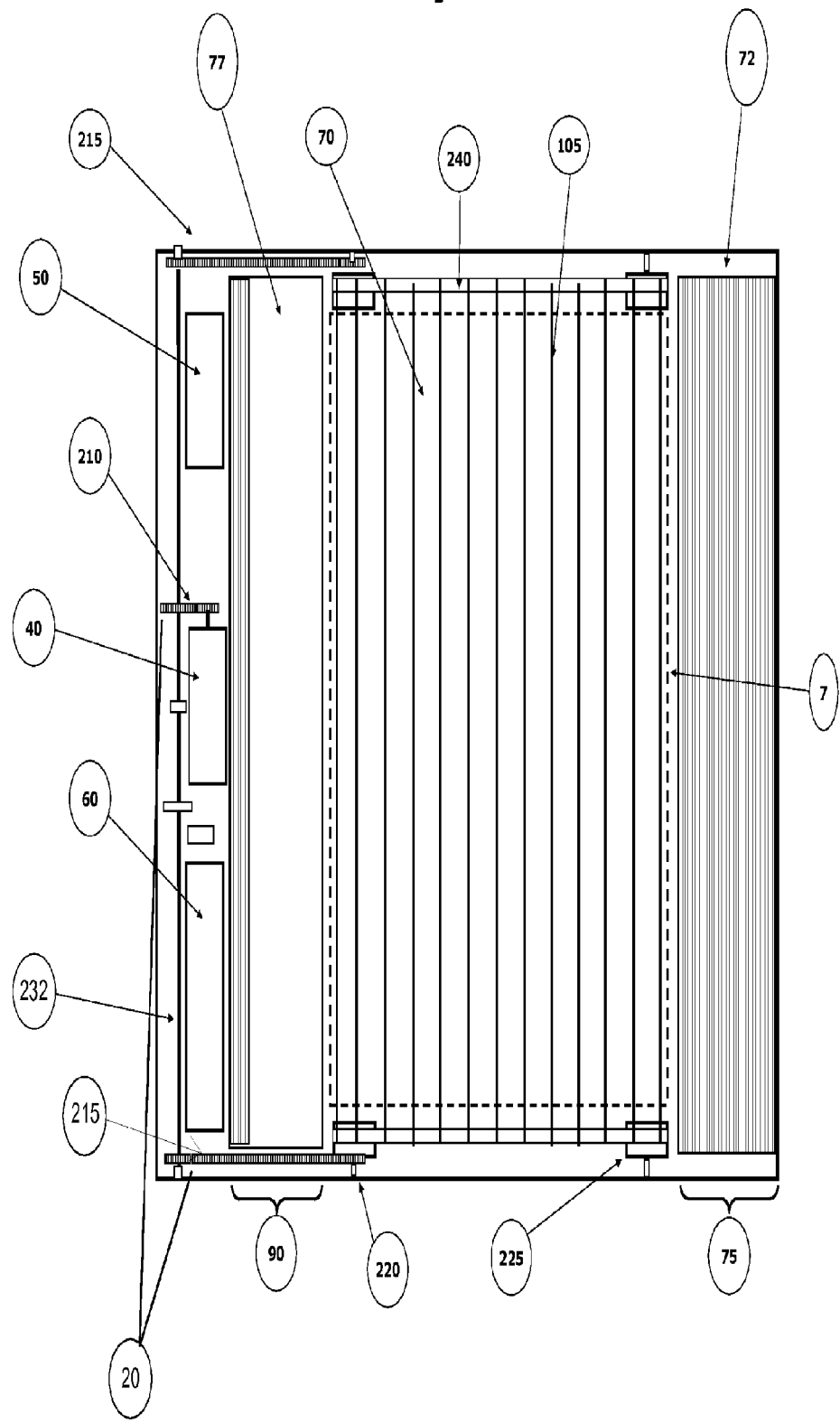
FIG. 3 shows a top view of a further embodiment of the instant invention.

FIG. 3 shows a top view of a further embodiment of the instant invention. The embodiment utilizes a similarly dimensioned direct replacement air filter having a sealed housing 10 that permits for direct replacement and use in existing HVAC units. The housing 10, controller 60, filter media 70 in its pleated and compacted state in a filter media storage area 75 are similar to the embodiment shown in FIG. 1. The motivator or movement device 20 in the exemplary embodiment of FIG. 3 can comprise a track member 230, supporting members 240. The supporting members 240 spaced to fit within the pleats of the filter media 70. The track member 230 is moved by the motor 40. The motor 40 drives gear set 210 that drives a driveshaft 232. The driveshaft 232 in turn drives chain drive 215 which engages and turns a drive sprocket 220 and idler sprocket 225 that couples to the track member 230 and moves the supporting members 240. This in turn moves the filter media 70 from the stored, pleated area 75 unfolding an uncontaminated portion 70 therein, exposing the uncontaminated portion 72 to the air and contaminants in the air channel at the exposure area or slot 7, and then moves the contaminated portion 77 of the filter media to the spent or containment area 90 where it is stacked again and stored.

Figure 4:
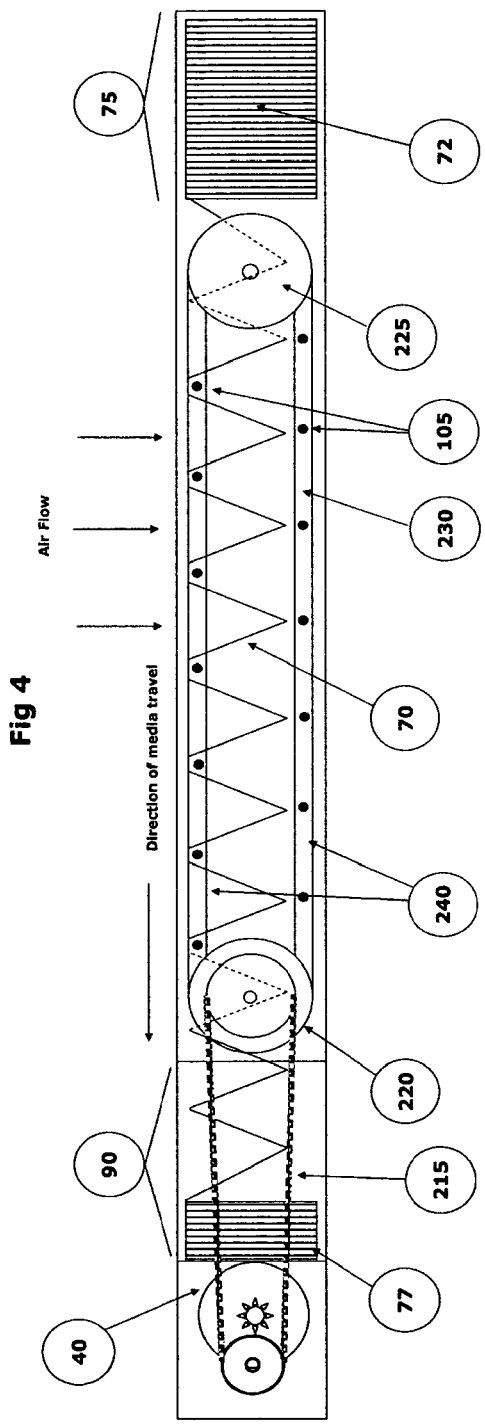
FIG. 4 shows a side view of the embodiment of FIG. 2.

FIG. 4 shows a side view of the embodiment of FIG. 3. The track member 230 with cross or support members 240 can be more clearly seen in this figure. The track member 230 is continuous and recycles the cross members 240. The pleats fold over the cross members 240 and are pulled by the cross members 240. The unexposed air filter media 72 is thus exposed to the air in the air channel and the air filtered. The cross members 240 allow the pleated, unexposed air filter media 72 to replace the spent filter media 77 in the air channel. The air in the air channel also pushes the filter media into a zig-zag form along the pleats similar to the formation shown in the embodiment of FIG. 1. This zig-zag form increases the surface area of the filter media 70 exposed to the air in the air channel.

Figure 5:
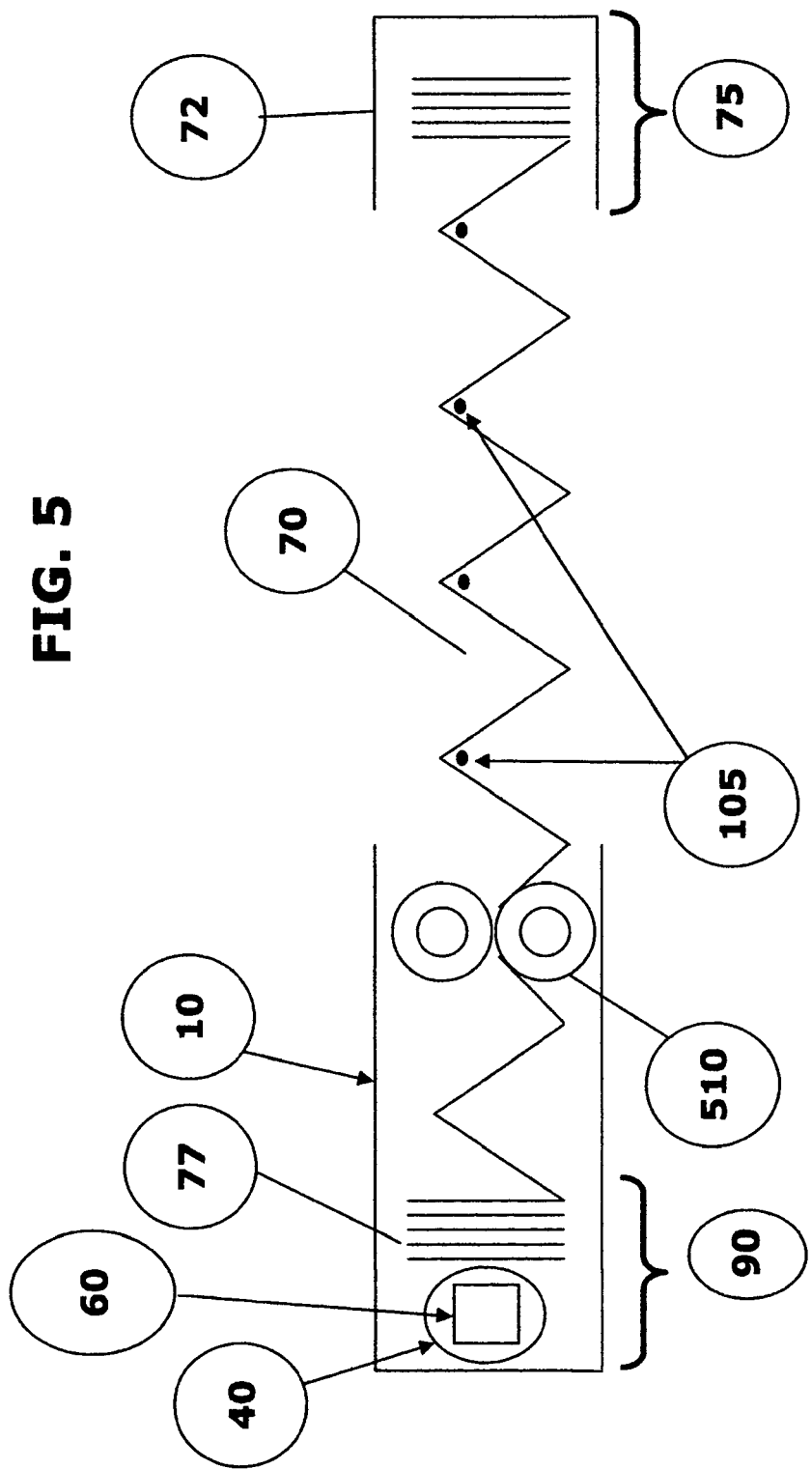
FIG. 5 shows a side view of a further embodiment of the invention.

FIG. 5 shows a side view of a further embodiment of the invention. In the embodiment shown, again the housing 10, motor 40, controller 60, filter media 70 in its pleated and compacted state in a filter media storage area 75 are all similar to the embodiment shown in FIGS. 1 and 2. The motivator or movement device 20 is simplified to an at least one set of puller or pinch rollers 510, that is the motivator or movement element pulls the filter media 70 from the pleated and compacted state in the filter media storage area 75 on the command of the controller 60 and moves it across the grid of lattice like members 105, as previously described above. In further embodiments the at least one set of puller or pinch rollers 510 can also be a star or toothed roller for added traction on the material or similar rollers that provide for efficient movement of the filter media within the device.

The lattice like members 105 allow the filter media 70 to more easily fold into its zig-zag pattern and act to support the media in place. As the filter media 70 is moved by the at least one set of puller roller 510 move the media 70 from a stored, pleated state in the filter media storage area 75 unfolding from an uncontaminated portion 72 therein, exposing the uncontaminated portion 72 to the air and contaminants in the air channel at the exposure area 7, and then moves the now contaminated portion 77 of the filter media, on a command from the controller 60, to the spent or containment area 90 where it is stacked again and stored.

The embodiment as shown has an at least one set of puller rollers 510, here a single puller roller set. However, the embodiment could use multiple sets of rollers as needed. The single puller roller set is located at an end of the exposure slot 7 that is closest to the containment area 90. It is within the spirit of the invention to locate the puller roller set at or near the stored, pleated area 75. Similarly, additional roller sets can be employed to move the filter media 70 as noted, for example a second puller roller set near the stored, pleated area 75.

Figure 6:
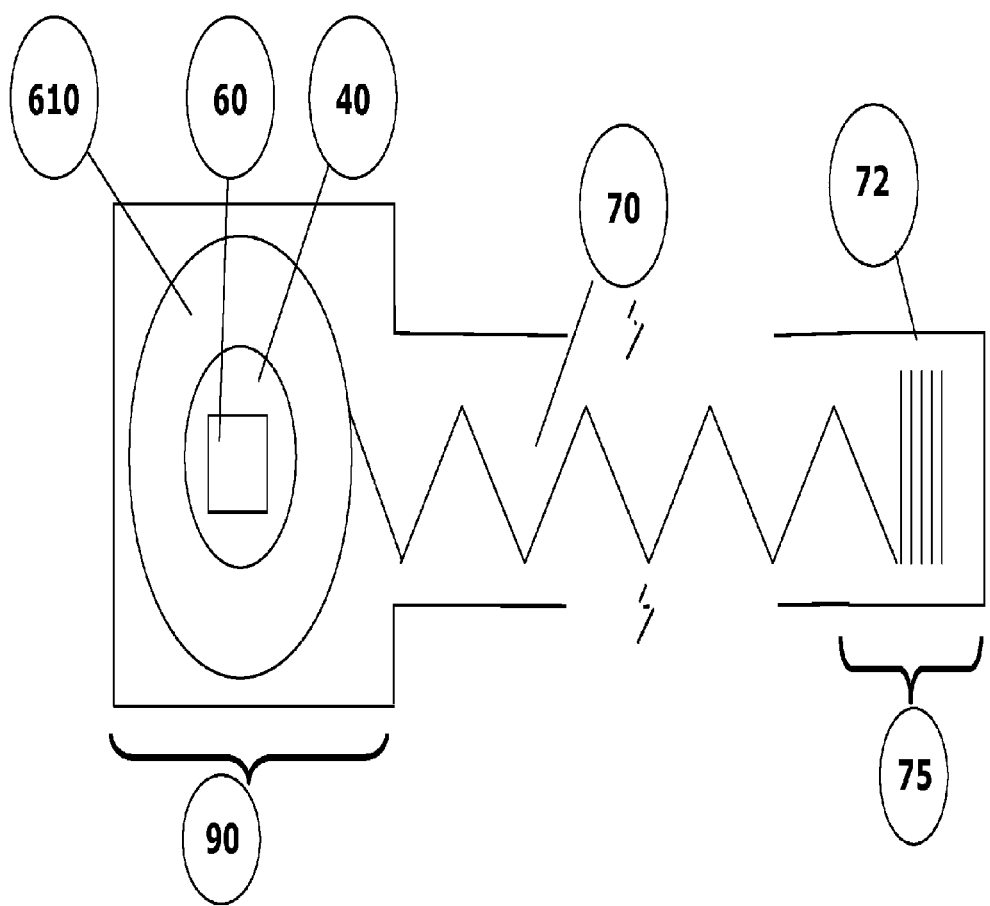
FIG. 6 shows another side view of a further embodiment of the invention.
Figure 7:
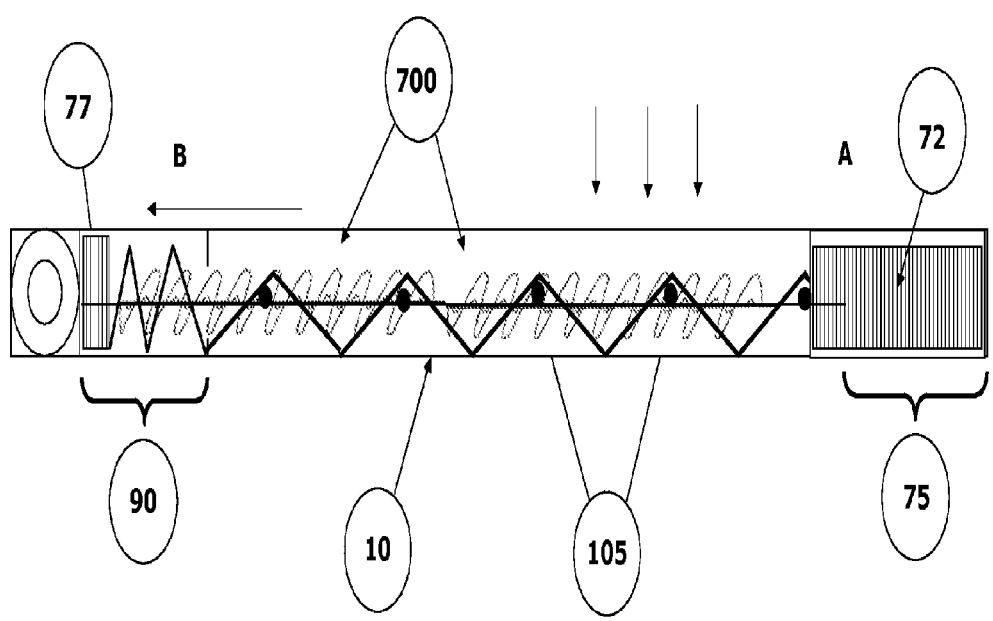
FIG. 7 shows another side view of a still further embodiment of the invention.

FIG. 6 shows another side view of a further embodiment of the invention. Similar to the previously described embodiments, the embodiment shown provides for a housing 10, controller 60, filter media 70 in its pleated and compacted state in a filter media storage area 75. A portion of unexposed filter media 72 is withdrawn from the media storage area 75, unfolded and drawn across a grid or lattice structure 105. The portion of unexposed filter media 72 is then drawn across the exposure slot 7 and exposed. In this embodiment, the motivator or movement device 20 is a take-up roller 610. The take up roller 610 rolls up the exposed filter media 77 in a flat roll format. The take up roller 610 is stored in the containment area 90 and can be sealed to prevent readmission of the filtered contaminates from the exposed filter media 77.

FIG. 6 shows another side view of a further embodiment of the invention. Similar to the previously described embodiments, the embodiment shown provides for a housing 10, controller 60, filter media 70 in its pleated and compacted state in a filter media storage area 75. A portion of unexposed filter media 72 is withdrawn from the media storage area 75, unfolded and drawn across a grid or lattice structure 105. The portion of unexposed filter media 72 is then drawn across the exposure slot 7 and exposed. In this embodiment, the motivator or movement device 20 is an at least one screw drive 700. The screw drive 700 allows for a strong connection to the filter media 70 and for continuous movement along the path from the filter media storage area 75 to the collection area 77.

The embodiments and examples discussed herein are non-limiting examples. The invention is described in detail with respect to preferred embodiments, and it will now be apparent from the foregoing to those skilled in the art that changes and modifications may be made without departing from the invention in its broader aspects, and the invention, therefore, as defined in the claims is intended to cover all such changes and modifications as fall within the true spirit of the invention.

What is claimed is:

1. A replacement media advancing air filter in an air handling unit with an air flow channel comprising:
    a housing having a substantially uniform thickness throughout the length and width of the housing and an at least one exposure slot;
    an at least one filter media storage area, having an at least one media with an at least one unexposed pleated, folded filter media portion stored therein, the at least one unexposed pleated, folded filter media portion being pleated, folded, and stacked in and compactly held at least in part within the at least one filter media storage area;
    an at least one motor coupled to a power supply and in communication with a controller, the at least one motor moving an at least one movement member that moves a portion of the at least one unexposed, pleated, folded filter media portion from a stored state in the at least one filter media storage area into the at least one exposure slot and exposes the unexposed pleated, folded filter media portion of the at least one filter media to the air in the air flow channel creating an exposed pleated portion of the at least one filter media, the exposed portion being moved in conjunction with an at least one supporting member and the movement of the exposed portion of the at least one filter media being based on output from the controller; and
    a containment area, wherein the exposed portion of the at least one filter media is collected within the containment area.

2. The replacement filter of claim 1, wherein the at least one movement member is an at least one cord, wire, or string, and the at least one cord, wire, or string is further attached to the pleated filter media via reinforcement tabs, wherein the at least one cord, wire, or string is rolled up on a take-up roller for a pre-determined time or length and the exposed filter media is moved to the collection area and the exposed media is folded at its pleats and stored in a compacted state.

3. The replacement filter of claim 1, wherein the at least one movement member is an at least track with an at least one supporting spanning member, the at least one track member being moved by the motor and in turn moving the at least one support member which engages the unexposed, folded, pleated filter media portion.

4. The replacement filter of claim 3, wherein the at least one track member engages the at least one filter media at a pleat and carries the unexposed filter media from the at least one filter media storage area to the exposure slot and then, upon a signal from the controller the motor further moves the track member and the at least one supporting and at least one support member to move the exposed filter media to the containment area.

5. The replacement filter of claim 1, wherein the containment area is sealed within the housing by a separate sealing element.

6. The replacement filter of claim 1, wherein the exposed portion of the at least one filter media is collected and the movement member re-folds the at least one pleated filter media after its exposure and stores it compactly in the containment area and a further portion of the unexposed, pleated, folded filter media from the at least one filter media is moved into the exposure slot to replace the exposed portion therein.

7. The replacement filter of claim 1, wherein when the at least one filter media is moved to the containment area and the exposed media is folded at its pleats and stored in a compacted state.

8. The direct replacement air handler filter of claim 1, wherein the controller further comprises a clock or a programmed advancement profile, wherein the at least one movement member is engaged based on the clock or the programmed advancement profile.

9. The replacement filter of claim 1, wherein the at least one movement member is an at least one roller, the roller moving the filter media from the pleated, folded storage area and taking up the exposed filter material and rolling it about the roller in a containment area.

10. The replacement filter of claim 1, wherein the at least one movement member is an at least one set of pinch rollers, the pinch rollers pulling the filter to pay out the filter media from the pleated, folded storage area and feeding the exposed filter media into a containment area.

11. The replacement filter of claim 1, wherein the at least one movement member is an at least one screw drive.

12. The replacement filter of claim 1, wherein the at least one power supply is a battery or battery pack.

13. The replacement filter of claim 1, wherein the at least one power supply is a commercial power supply supplied from a utility grid.

14. The replacement filter of claim 1, wherein the housing is sealed throughout to prevent opening of the housing.

15. A direct replacement air handler filter system within an air flow channel within an air handler unit comprising:
a housing having a substantially uniform thickness of between about one inch and three inches throughout its length and width and having an exposure slot there through and the housing being sealed throughout to prevent opening of the housing; a motor coupled to a power source and in communication with a controller having an at least one sensor input or a timer; and a filter media storage area located on one end of the housing, having a pleated, folded filter media folded and compactly stored substantially inside the filter media storage area, and an exposed filter media containment area located on an opposed end within the housing with the filter media extending therebetween in an operational state, the filter media being unstacked and an unexposed portion of the filter media being moved from said filter media storage area while being supported by an at least one support member with a fixed pleat spacing, across the housing and the exposure slot where it is exposed to air within the air flow channel which removes contaminants from the air and is then folded along its pleats into an exposed folded and pleated filter media portion and is further passed through to a containment area where the filter media is re-folded, collected, and compactly stored with the filtered contaminants, the motor being activated by said controller in response to input from the at least one sensor or based on a timed input from said timer and moving the at least one movement member to move the filter media across the exposure area.

16. A method of moving a pleated filter media within a uniform length and width, direct replacement air handler filter frame comprising the method steps of:
storing an unexposed folded, pleated filter media compactly within an at least one filter media storage area;
engaging an at least one motor coupled to a power supply in communication with a controller and the at least one motor moving an at least one movement member;
moving the at least one movement member by the at least one motor, and thereby moving an unexposed portion of the at least one filter media into an at least one exposure slot and exposing the unexposed portion of the at least one filter media to the air flow channel creating an exposed pleated portion of the at least one filter media, the exposed portion being paid out across an at least one supporting member with the at least one supporting member forcing the at least one filter media to fold at its pleats when placed into an air flow in the air flow channel and the paying out of the at least one filter media being based on output from the controller; and
collecting in a containment area the exposed portion of the at least one filter media.

* * * * *